Sept. 23, 1958   A. TIGERSCHIOLD   2,853,576
ELECTRIC SWITCH
Filed June 25, 1956   3 Sheets-Sheet 2
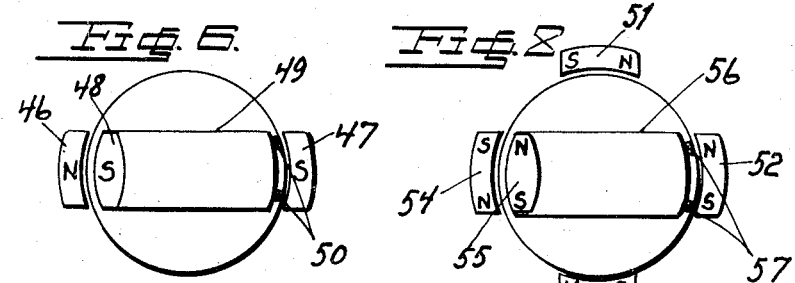
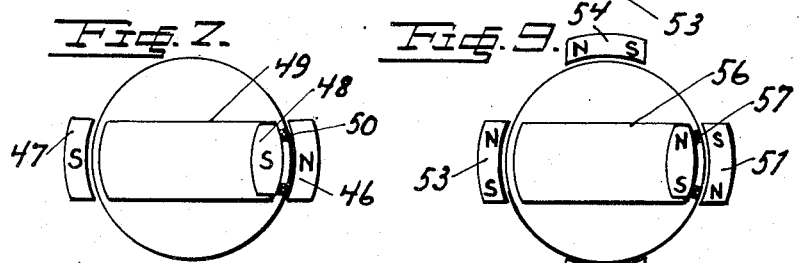
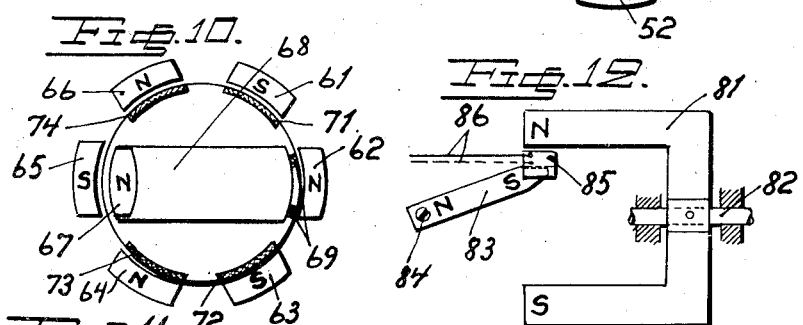
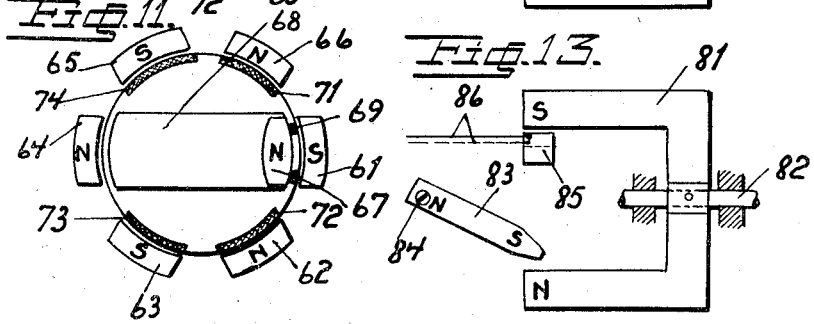

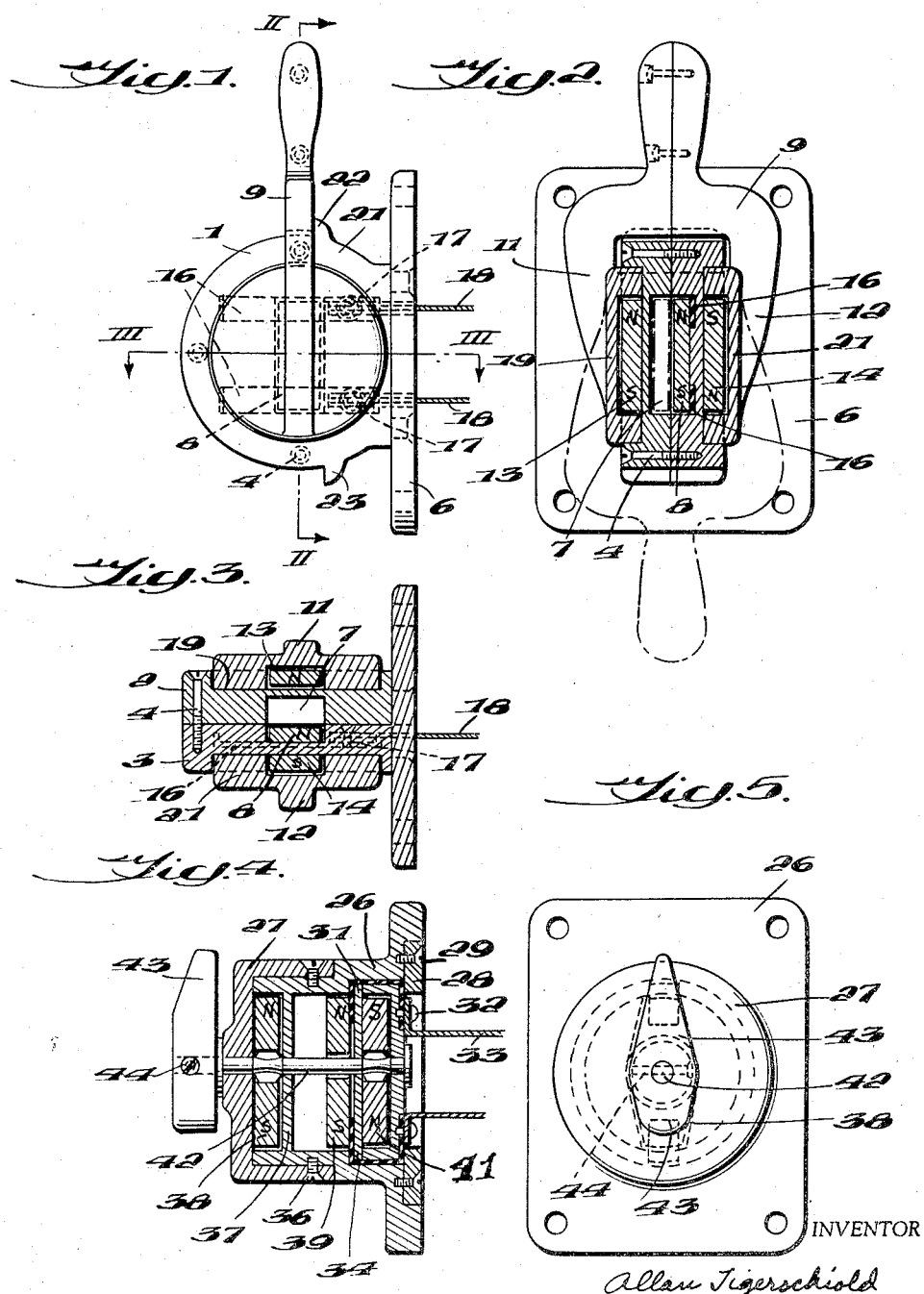

Sept. 23, 1958  A. TIGERSCHIOLD  2,853,576
ELECTRIC SWITCH

Filed June 25, 1956  3 Sheets-Sheet 3

United States Patent Office 2,853,576
Patented Sept. 23, 1958

2,853,576
ELECTRIC SWITCH

Allan Tigerschiold, Djursholm, Sweden, assignor to Gunnebo Bruks Aktiebolag, Gunnebobruk, Sweden, a company of Sweden Application June 25, 1956, Serial No. 593,397

Claims priority, application Sweden June 29, 1955

10 Claims. (Cl. 200—98)

Electrical switches are known, wherein an armature is controlled by control magnets. For instance, the Norwegian patent specification No. 56,680 discloses a switch, wherein a bar shaped armature is lifted by an electrical horseshoe magnet in order to close a circuit. When the current through the magnet is switched off, the armature falls due to gravity and opens the circuit.

The control magnets also may be permanent magnets. In this case the attraction between the armature and the magnets is brought to an end by removing the control magnets from the switch proper. Such a switch is disclosed in e. g. the British patent specification No. 492,189.

Further, also the armature may be a permanent magnet as disclosed in e. g. German patent specification No. 699,682. Therein an armature is shown which is movable longitudinally and is controlled by a rotary permanent magnet, which attracts the armature in one position and repels it in another position.

The present invention relates to an improved electrical switch, particularly of the kind comprising an armature which is provided with a permanent magnet and is movable along a path to close and open at least one electrical circuit thereby, and at least one control magnet, which is arranged to control the movable armature. The switch according to this invention is characterized in that the control magnets are rotatably mounted around a common axis of rotation so that in one position at least one magnet pole is attracting the permanent magnet of the bridge in one direction along said path, while simultaneously at least one magnet pole is repelling said permanent magnet in the same direction along said path, and in a second position the poles of the control magnets are reversed.

The permanent magnet of the armature may be arranged to shift rapidly between two positions. Then the permanent magnet is actuated in each position by at least two magnet poles, whereof one attracts and the other repels the permanent magnet. The armature will thereby be firmly secured in all positions. Therefore, such a switch may be mounted in all positions, and may also be mounted on a shaking base, e. g. a vehicle.

The permanent magnet of the armature may also be arranged so as to adopt an intermediate position between two end positions, e. g. by means of a spring. When the control magnets actuate the permanent magnet in a direction parallel to the path of movement, the force of the control magnets overcomes the force of said spring, and the permanent magnet is forced towards one of its end positions. When the control magnets on the other side adopt a position where they do not actuate the permanent magnet in a direction parallel to the path of movement, the position of the permanent magnet will be determined by said spring. A switch of this kind may be arranged to close two separate circuits when the permanent magnet is in its end positions, and to open said circuits when the permanent magnet is in its intermediate position.

According to a preferred embodiment the permanent magnet of the armature is movable in a direction perpendicular to a line between its poles. Preferably the permanent magnet is arranged so as to operate as a contact or armature, and should preferably have the shape of a straight magnet which is slidable in a housing which also contains contact members of an electrical circuit. The armature and the housing may be provided with guiding pins and notches in order to facilitate the motion of the armature in the housing. If desired, the permanent magnetic armature may be provided with a non-magnetic cover of considerable electrical conductivity, e. g., copper. In that case, the copper cover will be the main conductor for the current. By providing a casing around the permanent magnet, which may be performed by means of a simple pressing operation, the permanent magnet may be manufactured with precise dimensions and a smooth surface, which facilitates its sliding motion in the housing.

The invention will be described hereinafter with reference to the accompanying drawings which illustrate some embodiments of the switch according to the invention.

Fig. 1 is a vertical section of a switch to be mounted on a wall.

Fig. 2 is a section along line II—II in Fig. 1.

Fig. 3 is a section along line III—III in Fig. 1.

Fig. 4 is a vertical section of a second embodiment to be mounted on a wall.

Fig. 5 is a front view of the switch in Fig. 4.

Figs. 6–13 are diagrammatical sections of four different embodiments of the switch, each embodiment shown in two different positions.

Figure 14:
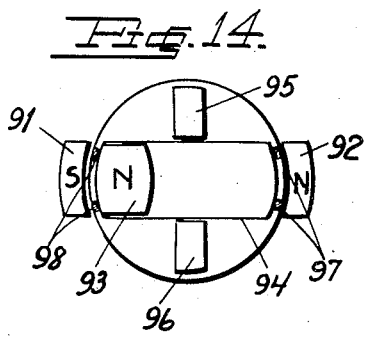
Figs. 14–16 show, in three different positions, an embodiment of a switch for two circuits.

The switch according to Figs. 1–3 consists of a housing 1 which is arranged on a panel 6, and is composed of two halves 2 and 3 interconnected by screws 4. Recesses in the two halves form a closed chamber 7 wherein a straight permanent magnet 8 is freely movable in a horizontal direction. One of the vertical walls of the chamber 7 contains contacts 16 which are connected to electric cables 18 by means of pole pieces 17. The permanent magnet 8 acts as a contact bridge and, consequently, maintains the circuit closed in the position illustrated.

Two circular disks 19, 21 are arranged on the vertical sides of the housing 1. Said disks are rotatably supported in the recessed side walls of the housing. Permanent magnets 13, 14 are arranged in the inner recessed sides of said disks. The disks are connected to each other and may be turned by means of a fork member 9. The movement of said fork member and said disks is limited by two shoulders 22, 23 on the housing 1.

In the position shown the permanent magnets which act as control magnets are parallel to the contact bridge 8. The pole direction of the control magnet 13 corresponds to that of the permanent magnetic contact bridge 8, whereas the poles of the control magnet 14 are opposite thereto. Consequently, the control magnet 13 repels the contact bridge 8 to the right in Fig. 2 whereas the control magnet 14 attracts the contact bridge to the right.

When the fork member 9 is reversed to its second position as shown in dotted lines in Fig. 2 the pole directions of the control magnets 13 and 14 will change, whereby the contact bridge 8 is moved to the left in Fig. 2 and thus opens the circuit.

In each position the contact bridge will be exposed to a force corresponding to the sum of the force of each magnet. It is as the attraction between two magnets decreases in proportion to the square of the distance, quite open that the attraction on the contact bridge from the control magnet 14 will be much stronger than the repulsion from the control magnet 13. When the fork member 9 is moved downwardly the control magnet 14 exposes the contact bridge to a repulsion force which is much stronger than the attraction force of the control magnet 13. Therefore, the contact bridge 8 will be repelled from the position of Fig. 2 with a force that is mainly derived from the control magnet 14. However, as the contact bridge approaches its left end position the attraction from the control magnet 13 will predominate.

The switch according to Figs. 4 and 5 consists of a housing in two halves 26 and 27. Said halves are connected by means of screws 36 and the part 26 is provided with a panel to be mounted on a wall. A rotatable shaft 42 extends through the housing and is provided with a knob 43 which is secured by means of a screw 44. Two permanent magnetic control magnets 38 and 41 are secured to the shaft. The control magnet 41 is arranged in a chamber formed between the forward wall of the housing part 27 and a partition 37 in the housing part 26. The control magnet 41 is arranged in a chamber formed between a loose partition 34 in the part 26 and a rear wall 28, which latter is fixed by means of screws 29 and, at the same time, secures the partition 34 in position.

In the space between the partitions 34 and 37 there is arranged a permanent magnet 39 which acts as a contact bridge. This contact bridge is provided with a central bore through which the shaft 42 extends. The space between the partitions 34 and 37 is shaped to correspond close to the shape of the contact bridge 39 so that this is prevented from rotation but is freely slidable along the shaft 42.

In said free space there is arranged a pair of contacts in the shape of bent plates 31 which are connected at the rear side of the rear wall 28 to pole pieces 32 for electric cables 33.

The switch according to Figs. 4 and 5 functions in the same manner as the switch according to Figs. 1–3.

In the switches according to Figs. 1–5 the control magnets should be exactly parallel to the contact bridge in their end positions. Thus, the angle between said end positions will be 180°. Provided that the movable parts will move without any appreciable friction it is, however, not necessary to move the fork member 9 resp. the knob 43 more than somewhat over 90° when reversing. This is due to the fact that the permanent magnetic contact bridge switches to its second end position immediately when the control magnet has been turned 90° and thereafter acts attracting respectively repelling upon the control magnets in such a direction, that said control magnets tend to move to the second end position without outer actuation.

In the embodiment diagrammatically shown in Figs. 6 and 7 two mutually parallel permanent magnetic control magnets 46 and 47 are rotatable along a circular path. A permanent magnetic contact bridge 48 is slidable in a closed housing 49 wherein contacts 50 are arranged. In the position of Fig. 6 the circuit is open. According to Fig. 7 the control magnets have been turned 180°, the contact bridge has moved to its second end position and established the contact between the contact points 50.

In the embodiment according to Figs. 8 and 9 four permanent magnetic control magnets 51, 52, 53 and 54 are lengthwise movable along a circular path. A permanent magnetic contact bridge 55 is slidable in a closed housing wherein contacts 57 are arranged. In the position according to Fig. 8 the circuit is open. In the position according to Fig. 9 the control magnets have been turned 90°, the contact bridge has moved to its second end position and closed the circuit.

In the embodiment according to Figs. 10 and 11 six equal spaced permanent magnetic control magnets are movable along a circular path. A permanent magnetic contact bridge 67 is slidable in a closed housing 68 wherein contacts 69 are arranged. In the position according to Fig. 10 the switch is switched off. In the position according to Fig. 11 the rotor with the control magnets has been turned 60°, the contact bridge has been moved to its second end position and the contacts 69 are connected.

As mentioned in connection with Figs. 1–5 a certain anchoring of the control magnets in the end positions will be obtained due to the attraction from the permanent magnetic contact bridge. This action may be improved by means of separate anchoring magnets as have been diagrammatically shown in Figs. 10 and 11. Along the circular path there are arranged four soft-iron armatures 71, 72, 73 and 74, which will be referred to as anchoring magnets hereinafter. Said anchoring magnets are arranged in such a manner that they will adopt a position immediately adjacent the control magnets which at this moment do not cooperate with the contact bridge. Due to the anchoring magnets the control magnets which at this moment are not disposed at any of the end positions of the contact bridge will be strongly anchored in their positions, wherefore a considerable force will be required to turn the rotor which carries the control magnets.

Figs. 12 and 13 diagrammatically show a switch comprising a horseshoe shaped permanent magnet 81 which is rotatable around a shaft 82. A contact bridge in the shape of a permanent magnet 83 is swingable around a shaft 84. A pair of contacts 85, to which electrical conductors 86 may be connected, are arranged in such a manner that the south pole of the contact bridge connects the contacts 85 in the position of Fig. 12. In the position according to Fig. 13 the horseshoe shaped magnet 81 has been turned 180°, the contact bridge has moved to its second end position and the connection between the contacts 85 is switched off.

Figure 15:
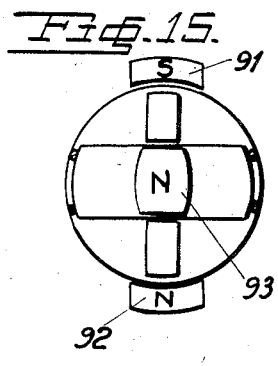
Figure 16:
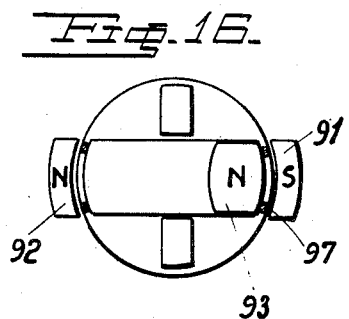

Figs. 14–16 show diagrammatically a switch for two circuits. Two permanent magnetic control magnets are arranged to rotate along a circular path. A permanent magnet 93, which operates as contact bridge, is arranged to be movable in a housing 94 which also contains two pairs of contacts 97, 98. Two soft iron armatures 95, 96 are arranged at the middle portion of the housing, diametrically opposite each other in the circular path. In the position shown in Fig. 14 the contact bridge 93 is in contact with the contacts 98, owing to the attraction of the control magnet 91 and the repelling of control magnet 92. If the control magnets are turned 90° to the position shown in Fig. 15 the bridge 93 is forced to the intermediate position, owing to the attraction of control magnet 91. Both circuits are then open. If the control magnets are turned another 90° the bridge 93 is forced to the contacts 97, owing to the attraction of magnet 91 and the repelling of magnet 92.

Thus, in the position shown in Fig. 15, the soft iron armatures 95, 96 serve both for forming magnet poles at the middle portion of housing 94, and for forming anchoring magnets for the control magnets 91 and 92.

Figure 17:
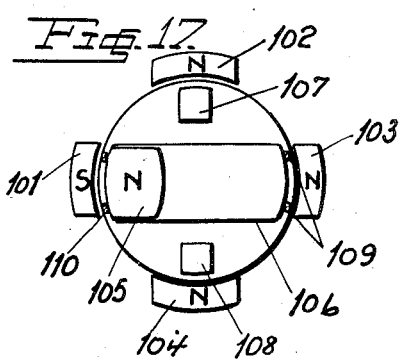
Figs. 17–19 show, in three positions, a second embodiment of a switch for two circuits.
Figure 18:
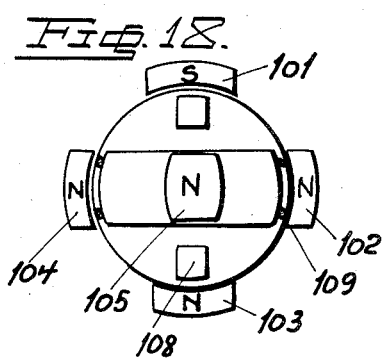
Figure 19:
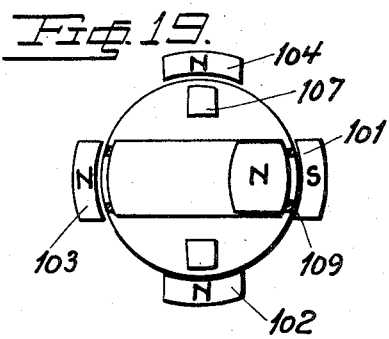

Figs. 17–19 show a second embodiment of a switch for two circuits. Four control magnets 101—104 are arranged to rotate along a circular path. A permanent magnetic contact bridge 105 is arranged movably in a housing 106 which also contains two pairs of contacts 109 and 110. At the middle portion of the housing there are arranged two soft iron magnets 107 and 108, substantially as described in connection with Figs. 14–16. In Figs. 17–19, however, the soft iron magnets 107—108 do not reach the walls of housing 106.

In the position shown in Fig. 17 the bridge 105 is pressed against the contacts 110 owing to the attraction of the control magnet 101 and the repelling of control magnets 102, 103 and 104. When the control magnets are turned 90° to the position shown in Fig. 18 the bridge 105 is forced to the intermediate position, owing partly to the attraction of magnet 101, partly to the repelling of magnets 102 and 104. When the control magnets are turned another 90° to the position shown in Fig. 19, the bridge 105 is forced to the contacts 109, owing to the attraction of magnet 101 and the repelling of magnets 102, 103 and 104.

Thanks to the diametrically opposite magnets 102 and 104 the position shown in Fig. 18 guarantees that bridge 105 is pushed away from contacts 109 and 110. The anchoring of bridge 105 in the intermediate position does not need to be so strong as in the embodiment illustrated in Figs. 14–16. Therefore, it is possible to make the soft iron magnets smaller in the embodiment shown in Figs. 17–19, or to make them be a little distance spaced apart from casing 106.

The housing for the contact bridge should preferably be air-tight, and may, if desired, be filled with an inert gas.

What is claimed is:

1. An electric switch comprising a housing having a bore therein, electrical contacts fixed in said bore, a permanent magnet contact bridge slidably movable in said bore and adapted to open and close said electrical contacts, and at least two control magnets of opposite polarity rotatably mounted on a common axis about said bore to actuate said contact bridge so that in one position at least one control magnet attracts the permanent magnet contact bridge in one direction along said bore, while simultaneously at least one control magnet repels said permanent magnet bridge in the same direction along said bore, and in a second position the poles of the control magnets are reversed.

2. A switch as claimed in claim 1, wherein said contact bridge is movable in a direction perpendicular to a line between its poles.

3. A switch as claimed in claim 2, characterized in that the permanent magnet is surrounded by a casing of non-magnetic material having a good electric conductivity, perferably copper.

4. A switch as claimed in claim 2, wherein two of said control magnets are parallel to said contact bridge, one of said parallel control magnets being positioned adjacent one end of said bore and the other being positioned adjacent the other end of said bore, said control magnets being rigidly connected to each other and being arranged to rotate around an axis of rotation which is parallel with the direction of movement of said permanent magnet bridge and which passes through the centre of said permanent magnet and of said parallel control magnets.

5. A switch as claimed in claim 4, characterized in that the parallel control magnets (38, 41) are secured to a shaft (42) which passes through an opening which is arranged centrally in the permanent magnet bridge (39).

6. A switch as claimed in claim 4, characterized in that the parallel control magnets (13, 14) are arranged on a fork member (9) which surrounds the permanent magnet bridge (8).

7. A switch as claimed in claim 2, characterized in that the control magnets comprise an even number of straight magnets (46, 47; 61–66) which are arranged to be rotatable, while being parallel with themselves, in a circular path, the permanent magnet contact bridge (48, 67) being arranged to be movable in a straight path between two diametrically opposite points of said circular path.

8. A switch as claimed in claim 7, characterized in that the control magnets comprise six straight magnets (61–66) arranged so as to have their poles in alternatingly opposite directions.

9. A switch as claimed in claim 2, characterized in that the control magnets comprise an even number of straight magnets (51–54) which are arranged so as to be rotatable in their longitudinal direction in a circular path, the permanent magnet contact bridge being arranged to be movable in a straight path between two diametrically opposite points of said circular path.

10. A switch as defined in claim 9 and further including stationary soft iron anchoring magnets arranged along the circular path so as to be situated adjacent those control magnets which are not situated at an end position of the permanent magnet contact bridge.

References Cited in the file of this patent

UNITED STATES PATENTS

| | | |
|---|---|---|
| 2,353,740 | Malone | July 18, 1944 |
| 2,521,723 | Hubbell | Sept. 12, 1950 |

FOREIGN PATENTS

| | | |
|---|---|---|
| 699,682 | Germany | Dec. 4, 1940 |
| 720,957 | France | Dec. 12, 1931 |

UNITED STATES PATENT OFFICE
CERTIFICATE OF CORRECTION

Patent No. 2,853,576                                September 23, 1958

Allan Tigerschiold

It is hereby certified that error appears in the printed specification of the above numbered patent requiring correction and that the said Letters Patent should read as corrected below.

Column 6, line 3, after "magnet" insert -- bridge --.

Signed and sealed this 3rd day of March 1959.

(SEAL)
Attest:

KARL H. AXLINE                                      ROBERT C. WATSON

Attesting Officer                                    Commissioner of Patents